(12) United States Patent
Duncan

(10) Patent No.: US 8,956,125 B2
(45) Date of Patent: Feb. 17, 2015

(54) METHOD FOR DETERMINING PUMP FLOW RATE

(75) Inventor: Stuart McMillan Duncan, Shailer Park (AU)

(73) Assignee: Multitrode Pty Ltd, Eight Mile Plains, QLD (AU)

( * ) Notice: Subject to any disclaimer, the term of this patent is extended or adjusted under 35 U.S.C. 154(b) by 1270 days.

(21) Appl. No.: 12/366,580

(22) Filed: Feb. 5, 2009

(65) Prior Publication Data
US 2009/0202359 A1    Aug. 13, 2009

(30) Foreign Application Priority Data

Feb. 8, 2008 (AU) ............................... 2008900591
Oct. 1, 2008 (AU) ............................... 2008229735

(51) Int. Cl.
*F04B 49/02* (2006.01)
*G01F 1/00* (2006.01)

(52) U.S. Cl.
CPC ............................ *G01F 1/007* (2013.01)
USPC .......... 417/23; 417/2; 417/7; 417/20; 417/28; 73/861

(58) Field of Classification Search
USPC ............................ 417/43, 2, 7, 20, 28; 73/861
See application file for complete search history.

(56) References Cited

U.S. PATENT DOCUMENTS

| | | | | |
|---|---|---|---|---|
| 2,101,257 A | * | 12/1937 | Vogel-Jorgensen | ............ 73/223 |
| 4,669,308 A | | 6/1987 | Jorritsma | |
| 4,999,117 A | * | 3/1991 | Palmu et al. | ................. 210/744 |
| 5,385,056 A | | 1/1995 | March et al. | |
| 5,428,527 A | * | 6/1995 | Niemi | .............................. 700/32 |
| 5,497,664 A | * | 3/1996 | Jorritsma | ........................ 73/861 |
| 5,591,010 A | * | 1/1997 | Van Zyl | .......................... 417/12 |
| 5,831,174 A | * | 11/1998 | Beaudoin | ........................ 73/861 |
| 5,898,375 A | * | 4/1999 | Patterson | ...................... 340/612 |

OTHER PUBLICATIONS

Machine Translation of DE019507698.*
European Search Report, European Application No. EP 09001716, Mar. 27, 2009, 5 pages.
European Search Opinion & Report, European Patent, Mar. 27, 2009.
DE 19507698 (with English abstract), Sep. 5, 1996.

* cited by examiner

*Primary Examiner* — Nimeshkumar Patel
*Assistant Examiner* — Jacob R Stern
(74) *Attorney, Agent, or Firm* — Hunter Clark PLLC

(57) ABSTRACT

The present invention relates to a method for determining a flow rate indicator relating to the output flow rate of one or more activated pumps of a pumping station. The pumping station includes a well to be at least partially emptied by the pumps and an inlet through which inflow can be supplied into the well. The method includes the step of determining, using a computational device, an operating condition relating to the activated pumps. The pumps are temporarily deactivated and an inflow rate indicator relating to the inflow is determined using the computational device, responsive to the determination of the operating condition. The method further includes the step of determining, using the computational device, the flow rate indicator using the determined inflow rate indicator. The present invention is equally applicable to a well to be at least partially filled by the pumps.

8 Claims, 4 Drawing Sheets

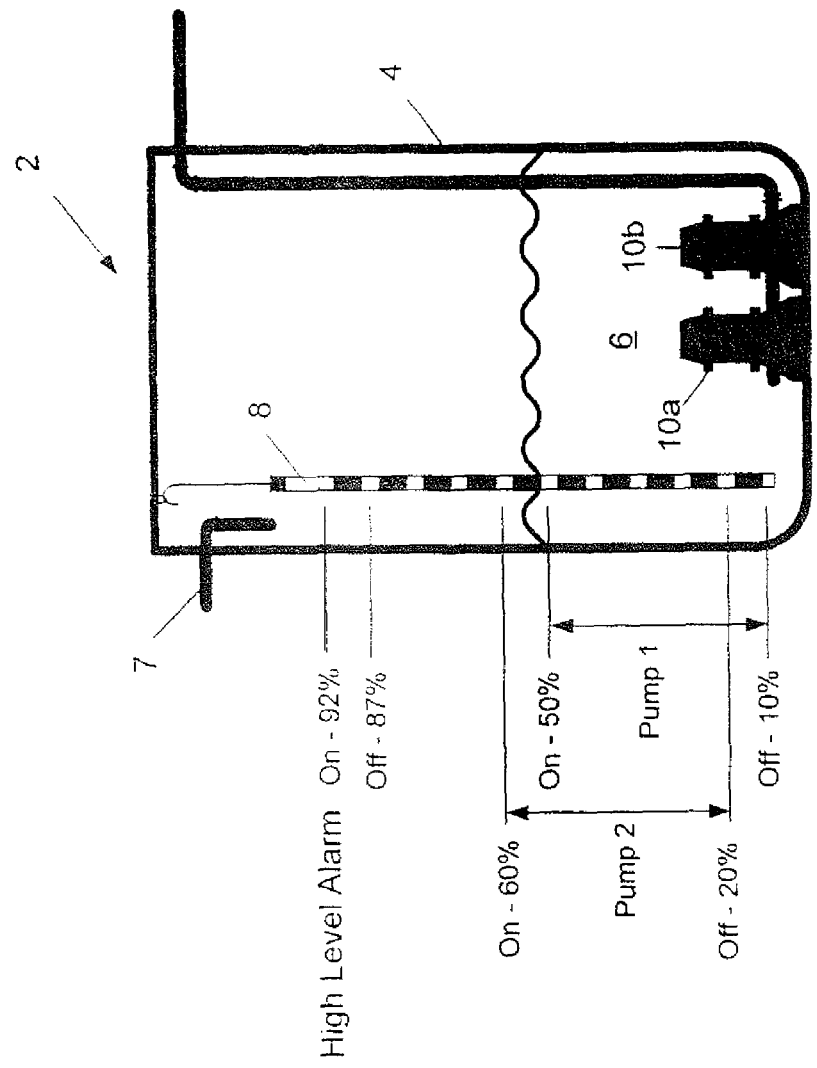

METHOD FOR DETERMINING PUMP FLOW RATE

CROSS-REFERENCE TO RELATED APPLICATIONS

This application is related to and claims priority from Australian Patent Application No.: 2008900591 filed on Feb. 8, 2008 and Australian Patent Application No.: 2008229735 filed on Oct. 1, 2008, each of which is incorporated by reference herein in its entirety.

TECHNICAL FIELD

The present invention generally relates to pumping stations. The present invention has particular, although not exclusive application to waste water pumping stations.

BACKGROUND

The reference to any prior art in this specification is not, and should not be taken as an acknowledgement or any form of suggestion that the prior art forms part of the common general knowledge.

Pumping stations 2 for emptying sewage wells (FIG. 1a) and filling water wells (FIG. 1b) are known. As shown in FIG. 1a, waste water and sewage is supplied to the well 4 via an inlet 7 and the pumps 10 are configured to empty the well 4. In contrast, FIG. 1b shows that water drains from the water well via outlet 9 and the pumps 10 are instead configured to fill the well 4.

These pumping stations 2 include the well 4 in which liquid 6 is located, a level sensor 8 for sensing the liquid level in the well 4, a pair of pumps 10a, 10b for pumping liquid into or out of the well 4 as required, and a controller (not shown) in communication with sensor 8 and for controlling the operation of the pumps 10a, 10b based on the sensed liquid level in the well 4. FIG. 1 shows various level trigger-points along the level sensor 8 in the form of liquid sensing electrodes. The controller independently activates or de-activates the pumps 10a, 10b with hysteresis in response to it sensing the liquid level via the electrodes.

The controller can display the instantaneous output flow rate of the pumps 10 upon a display which a pumping station supervisor can monitor. The instantaneous flow rate can be sensed using a flow meter, however, such sensors are undesirably expensive. As a cheaper alternative, the flow rate for each pump cycle can instead be estimated.

A known flow rate estimation method is now briefly described with reference to FIG. 1a. The inflow rate (I) through inlet 7 can be readily determined, when the pumps 10 are deactivated, as follows:

$$I = \frac{\Delta V_{well}}{\Delta t} \quad (1)$$

where $\Delta V_{well}$ is the change in liquid volume in the well 4 that can be measured using liquid sensor 8 and $\Delta t$ is the change in time.

Upon activation of one or both of the pumps 10, the output flow rate (F) of the pumps 10 can be determined by the following equation:

$$F = \frac{\Delta V_{well}}{\Delta t} + I \quad (2)$$

where the inflow (I) is measured once immediately prior to the activation of the pumps 10. However, the inflow (I) may be prone to variation during a pump activation cycle. Therefore the output flow rates of the pumps can instead be determined by averaging a number of prior calculations of the flowrate.

When the pumps 10 are continuously activated for a long period of time during a pumping cycle, the output flow rate (F) of the pumps 10 can instead be determined, by averaging a number of prior inflow rates (I) determined when the pumps 10 were deactivated, as follows:

$$F = \frac{\Delta V_{well}}{\Delta t} + I_{ave} \quad (3)$$

where $I_{ave}$ is the average inflow rate determined by averaging a number of previous inflow rates (I) determined in accordance with Eq. 1 (e.g. ten previous inflow rates).

However, the flow rate (F) determined in accordance with Eq. 3 can become inaccurate under certain circumstances including, for example, when the actual inflow rate suddenly changes significantly (e.g. during a downpour). In this event, the displayed flow rate (F) is reduced and the pumping station supervisor cannot reliably ascertain whether a pump 10 is blocked or the actual inflow rate through inlet 7 has increased, which is clearly undesirable.

It is an object of the present invention to provide a method of more accurately determining the output flow rate (F) of the activated pumps than the method described above in relation to Eq. 3.

SUMMARY OF THE INVENTION

According to an aspect of the present invention, there is provided a method for determining a flow rate indicator relating to the output flow rate of one or more activated pumps of a pumping station, the pumping station including a well to be at least partially emptied by the pumps and an inlet through which inflow can be supplied into the well, the method including the steps of:

determining, using a computational device, an operating condition relating to the activated pumps;

temporarily deactivating the pumps and determining an inflow rate indicator relating to the inflow using the computational device, responsive to the determination of the operating condition; and determining, using the computational device, the flow rate indicator using the determined inflow rate indicator.

The operating condition may be that the flow rate indicator is less than a predetermined flow rate threshold. The predetermined flow rate threshold may be calculated as a percentage reduction of a prior flow rate indicator.

The operating condition may be that the pumps have been activated for a period more than a predetermined time threshold. The predetermined time threshold may be calculated as a percentage increase of a prior duration that the pumps were activated.

Prior to the step of temporarily deactivating the pumps, the method may further include the step of determining that the well level does not exceed a predetermined well level threshold.

The step of temporarily deactivating the pumps typically involves deactivating the pumps for a predetermined period of time and determining the inflow rate indicator over that period.

The step of determining the flow rate indicator may involve using a determined well volume rate indicator.

The method may further include the step of displaying any one or more of the determined: inflow rate indicator, flow rate indicator and well volume rate indicator.

According to another aspect of the present invention, there is provided a method for determining a pump flow rate indicator relating to the output flow rate of one or more activated pumps of a pumping station, the pumping station including a well configured to receive or supply fluid flow, the method including the steps of:

determining, using a computational device, an operating condition relating to the activated pumps;

temporarily deactivating the pumps and determining a well flow rate indicator relating to the fluid flow using the computational device, responsive to the determination of the operating condition; and determining, using the computational device, the pump flow rate indicator using the determined well flow rate indicator.

According to another aspect of the present invention, there is provided a method for determining a flow rate indicator relating to the output flow rate of one or more activated pumps of a pumping station, the pumping station including a well to be at least partially filled by the pumps and an outlet through which outflow can exit from the well, the method including the steps of:

determining, using a computational device, an operating condition relating to the activated pumps;

temporarily deactivating the pumps and determining an outflow rate indicator relating to the outflow using the computational device, responsive to the determination of the operating condition; and determining, using the computational device, the flow rate indicator using the determined outflow rate indicator.

According to a further aspect of the present invention, there is provided the computational device configured to perform any one or more of the preceding methods. Preferably, the computational device is a pump controller.

According to a further aspect of the present invention, there is provided a pump controller for determining a pump flow rate indicator relating to the output flow rate of one or more activated pumps, the pump controller being configured to:

determine an operating condition relating to the activated pumps;

temporarily deactivate the pumps and determine a well flow rate indicator relating to fluid flow of a well, responsive to the determination of the operating condition; and determine the pump flow rate indicator using the determined well flow rate indicator.

According to another aspect of the invention there is provided a pump controller for determining a pump flow rate indicator relating to the output flow rate of one or more activated pumps, the pump controller including:

a processor in communication with ports for connection to one or more activated pumps; and a memory in communication with the processor, the memory containing a software product including:

routines for determining an operating condition relating to the activated pumps;

routines for temporarily deactivating the pumps and determining a well flow rate indicator relating to fluid flow of a well, responsive to the determination of the operating condition; and routines for determining the pump flow rate indicator using the determined well flow rate indicator.

According to a further aspect of the present invention, there is provided a media, such as a magnetic or optical disk or solid state memory, containing computer readable instructions for execution by a processor to thereby perform any one or more of the preceding methods.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 1a is a schematic diagram of a pumping station for emptying a sewage well;

DETAILED DESCRIPTION OF PREFERRED EMBODIMENTS

Figure 1B:
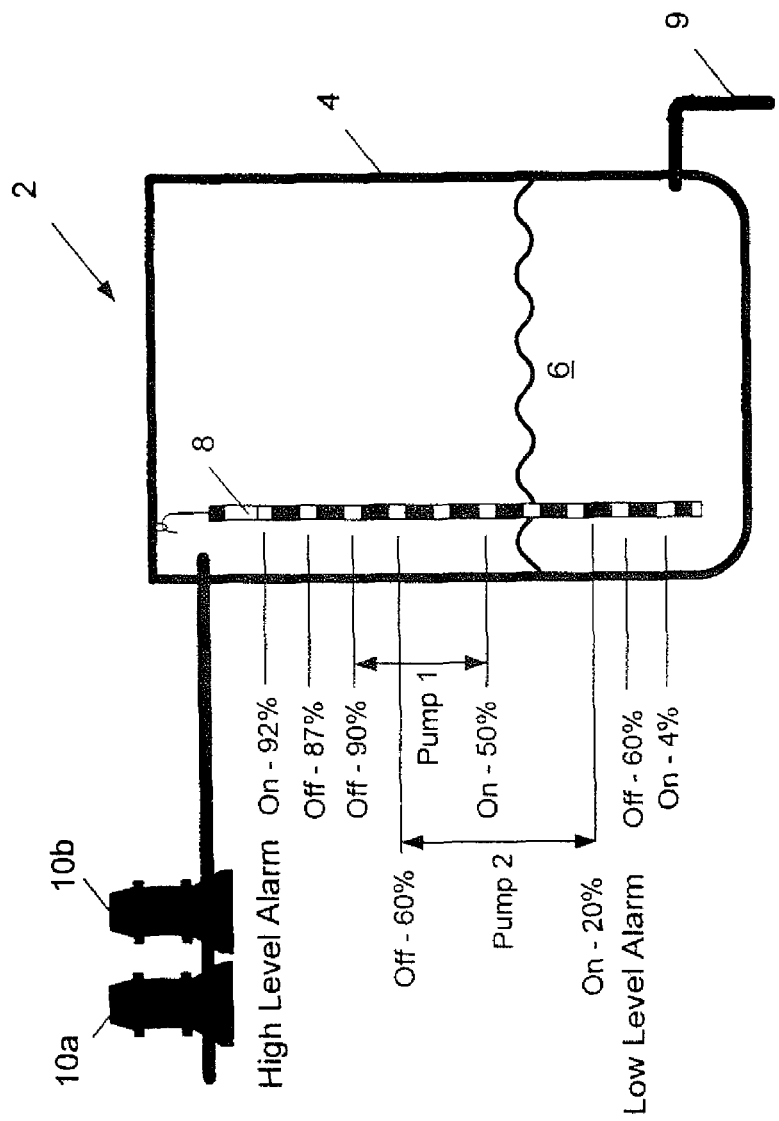
FIG. 1b is a schematic diagram of a pumping station for filling a water well.

An embodiment of the present invention will now be described with reference to a controller 14 shown in FIG. 2 that is configured to control the pumping station 2 shown in FIG. 1a.

Referring initially to FIG. 1a, the pumping station 2 includes a level sensor 8 for sensing the liquid level in a well 4, and a pair of pumps 10a, 10b (e.g. three-phase variable speed drive pumps) for pumping liquid out of the well 4 to at least partially empty the well 4. Waste water including storm water flows into the well 4 through inlet 7. The controller 14 is suitable for controlling the activation and deactivation of the pumps 10 based on the sensed liquid level in the well 4. The activation and deactivation trigger points along the level sensor 8 for a first pump 10a and a second pump 10b are clearly shown in FIG. 1a. The controller 14 can also determine a well volume indicator (in the form of a variable or value), relating to the liquid volume in the well 4, using the liquid level sensor 8. Typically, the level sensor 8 includes an array of equidistant electrode sensing stations, and the uppermost triggered station corresponds to the well liquid level which, in turn, can be correlated to a corresponding liquid volume in the well 4 (using a look-up table).

Figure 2:
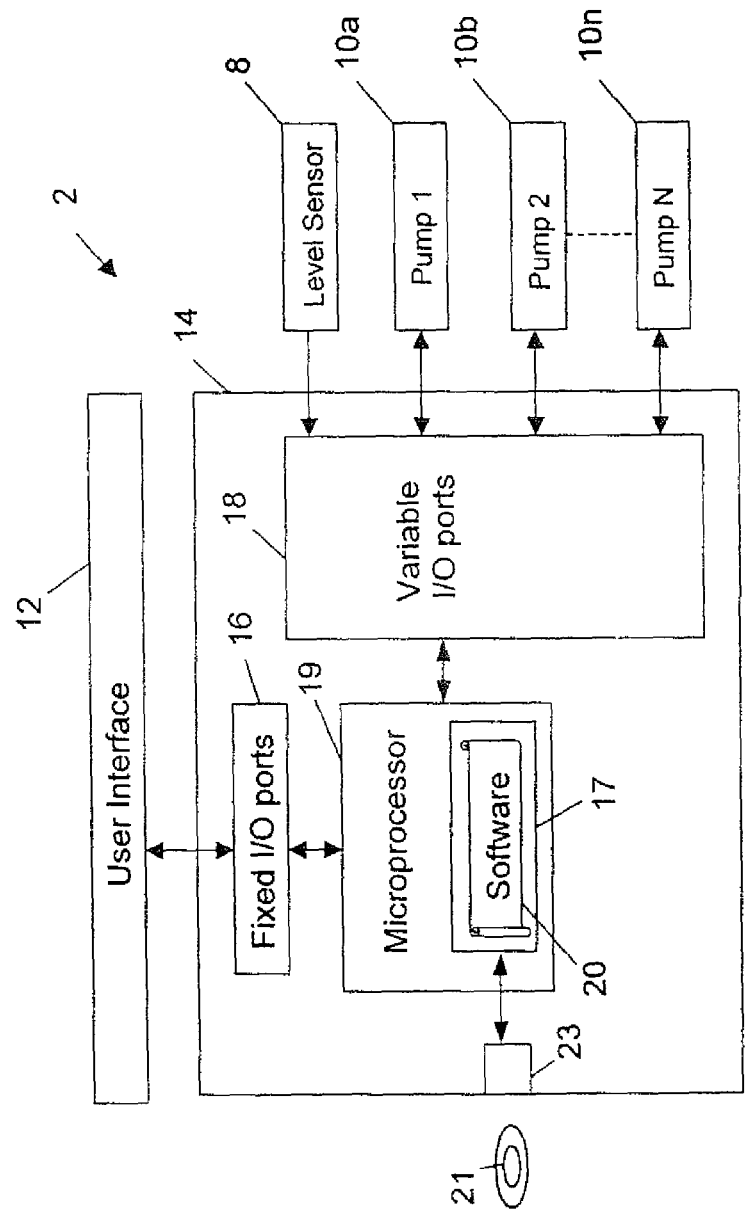
FIG. 2 is a block diagram showing a pump controller suitable for use with either pumping station of FIG. 1a or FIG. 1b.

Referring to FIG. 2, a user interface 12 is provided to enable the pumping station supervisor to input data to the controller 14 and review controller data relating to the operation of the pumping station 2 on a display. For example, the controller 14 is configured to display a flow rate indicator (F) relating to the output flow rate of the activated pumps 10a, 10b, an inflow rate indicator (I) relating to the inflow through inlet 7, and a net well volume rate indicator (i.e. F-I). The user interface 12 is fixedly wired to fixed input/output (I/O) ports 16 of the controller 14 which, in turn, are interfaced using suitable circuitry to a microprocessor 19 that executes a software product 20.

The level sensor 8 and pumps 10 are wired to variable I/O ports 18 of the controller 14 which, in turn, are interfaced using suitable circuitry to the microprocessor 19. The wiring configuration between the variable I/O ports 18 and the peripheral hardware is prone to variation depending upon the type of peripheral hardware (e.g. level sensor 8, pumps 10, etc.) used in the pumping station 2. The software product 20 includes instructions for processor 19 to execute, and enable controller 14 to perform the method 50 for determining a flow rate indicator (F) relating to the output flow rate of the activated pumps 10 of the pumping station 2. Software product 20 (including software routines) is typically provided in a memory device 17 of microprocessor 19, or on a magnetic or optical disc 21 which microprocessor 19 can access by means of disc drive 23.

Figure 3:
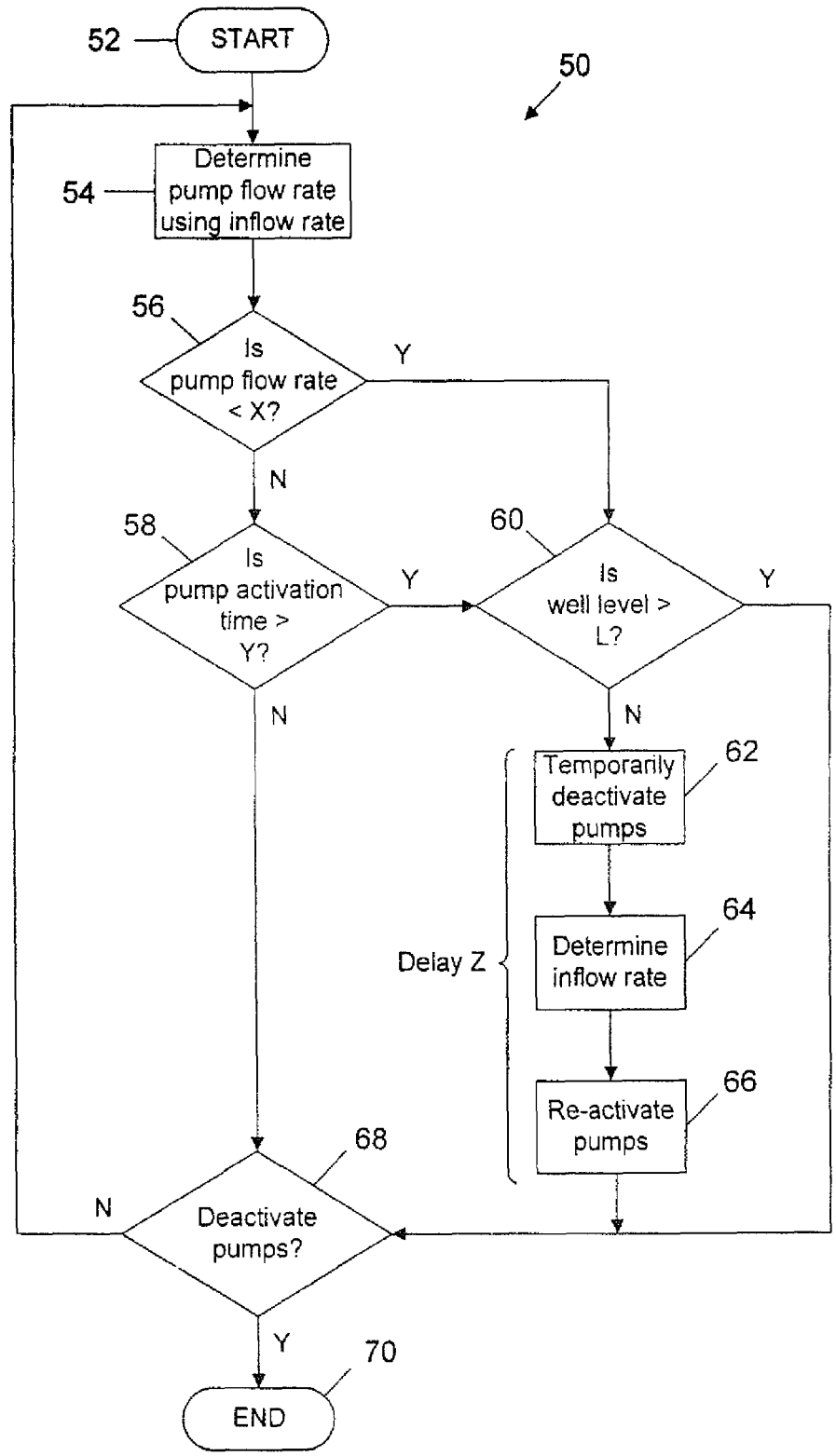
FIG. 3 is a flowchart showing a method in accordance with an embodiment of the present invention, the method being suitable for determining a pump flow rate for the pumps of the pumping station of FIG. 1a and performed by the controller of FIG. 2.

According to an embodiment of the present invention, there is provided the method 50 performed by controller 14 and for determining a flow rate indicator (F) relating to the output flow rate of the activated pumps 10 of the pumping station 2. The method 50 is described in detail below with reference to FIG. 3.

Initially, the method begins at step 52 when the controller 14 activates at least one of the pumps 10a, 10b upon determining that corresponding activation trigger points of the level sensor 8 have been triggered. Prior to activating the pumps 10, the controller 14 periodically calculates the inflow rate indicator (I) using Eq. 1 and stores this variable value. Upon activating the pumps 10, the controller initializes a pump activation cycle timer to measure the duration of the present pump activation cycle.

At step 54, the controller 14 determines an output flow rate indicator (F) using Eq. 2. The inflow rate indicator (I) used is either determined prior to activating the pumps 10 at step 52, or updated at step 64 as described in detail below. The flow rate indicator (F) is also determined using the well volume rate indicator $$\frac{\Delta V_{well}}{\Delta t}$$

determined by the controller 14 using measurements from the liquid level sensor 8. The controller 14 displays the determined output flow rate indicator (F), measured inflow rate indicator (I) and measured well volume rate indicator on a display.

At steps 56 and 58, the controller 14 determines respective operating conditions relating to the activated pumps 10. If either operating condition is satisfied, then the method 50 proceeds to step 60. Otherwise, the method 50 proceeds to step 68.

Elaborating further in relation to the operating condition of step 56, the controller 14 determines whether the pump flow rate indicator (F) determined at step 54 is less than a predetermined flow rate threshold (X). The controller 14 calculates the predetermined flow rate threshold (X) as a percentage reduction (e.g. 10%) of a prior flow rate indicator (F).

Elaborating further in relation to the operating condition of step 58, the controller 14 determines, using the pump activation cycle timer, whether the pumps have been activated for a period more than a predetermined time threshold (Y). The controller 14 calculates the predetermined time threshold (Y) as a percentage increase (e.g. 10%) of a prior duration that the pumps were activated in the previous pump activation cycle.

Responsive to the determination of one of the operating conditions at step 56 or step 58, at step 60 the controller 14 determines whether or not the instantaneous well liquid level measured with level sensor 8 exceeds a predetermined maximum safe well level threshold (L). If the measured liquid level in the well 4 exceeds the safe well level threshold (L), then the pumps remain safely activated and the method 50 proceeds to step 68. Alternatively, if the measured liquid level in the well 4 does not exceed the safe well level threshold (L), then the method 50 proceeds to step 62.

At step 62, the controller 14 temporarily deactivates any activated pumps 10.

At step 64, the controller 14 re-determines and updates inflow rate indicator (I) using Eq. 1. The updated inflow rate indicator (I) can later be used when calculating the pump flow rate indicator (F) at step 54.

At step 66, the controller 14 reactivates any pumps which were deactivated in step 62.

Steps 62 to 66 typically have an introduced delay for a predetermined period of time (Z) to enable enough time for an accurate inflow rate indicator (I) to be determined at step 64. The predetermined period of time (Z) would typically be short (e.g. 10 seconds) when compared with the pump activation cycle (e.g. of the order of minutes).

At step 68, the controller 14 determines whether the liquid level in the well has dropped below the deactivation trigger-points along the level sensor 8 for both pumps 10a, 10b. If this operating condition is not met, the method 50 proceeds to step 54. Alternatively, if this operating condition is met, the method 50 proceeds to step 70 where the controller 14 deactivates the pumps 10a, 10b and stops the pump activation cycle timer. Accordingly, the pump activation cycle has ended.

The method 50 provides for the accurate determination of the output flow rate indicator (F) of the pumps 10, by temporarily deactivating the pumps 10 during a pumping cycle to accurately measure the inflow rate and obtain the corresponding flow rate indicator (I).

A person skilled in the art will appreciate that many embodiments and variations can be made without departing from the ambit of the present invention.

The preferred embodiment was described with reference to a pumping station 2 for emptying a sewage well as shown in FIG. 1a. The skilled person will readily appreciate that the present invention is similarly applicable to the pumping station for filling a water well as shown in FIG. 1b. Accordingly, a method can be provided for determining a flow rate indicator (F) relating to the output flow rate of the activated pumps 10 of the pumping station 2 shown in FIG. 1b. That pumping station 2 includes a well 4 to be at least partially filled by the pumps 10 and an outlet 9 through which outflow can exit from the well 4. The method includes the step of determining, using the controller 14, an operating condition relating to the activated pumps 10. The method further includes the step of temporarily deactivating the pumps 10 and determining an outflow rate indicator relating to the outflow using the pump controller 14, responsive to the determination of the operating condition. The method also involves determining, using the pump controller 14, the flow rate indicator (F) using the determined outflow rate indicator.

The foregoing embodiments were described in relation to pumping stations 2 including a pair of pumps 10a, 10b, although any number of pumps may be used.

In the preferred embodiment, the volume of liquid in the well 4 was determined using the liquid level sensor 8. In an alternative embodiment, the pumping station 2 may include either a pressure sensor or an ultrasonic sensor located at the base of the well 4 to be used by the controller 14 to determine the volume of liquid in the well 4.

In compliance with the statute, the present invention has been described in language more or less specific to structural or methodical features. It is to be understood that the invention is not limited to specific features shown or described since the means herein described comprises preferred forms of putting the present invention into effect. The present invention is, therefore, claimed in any of its forms or modifications within the proper scope of the appended claims appropriately interpreted by those skilled in the art.

What is claimed is:

1. A method executed by a pump controller for determining a pump output flow rate of one or more activated pumps of a pumping station, the pumping station including a well to be at least partially emptied by the pumps and an inlet through which inflow can be supplied into the well, the method when executed by the pump controller, causes the pump controller to automatically carry out the steps of:

determining a pump operating condition intrinsic to the activated pumps;

temporarily deactivating the pumps during a pump activation cycle and determining an inflow rate relating to the inflow, responsive to the determination of the pump operating condition; and determining the pump output flow rate using the determined inflow rate, wherein the step of temporarily deactivating the pumps involves deactivating the pumps for a predetermined period of time and determining the inflow rate over that period of time.

2. The method as claimed in claim 1, wherein the pump operating condition is that the pump output flow rate is less than a predetermined flow rate threshold.

3. The method as claimed in claim 2, wherein the predetermined flow rate threshold is calculated as a percentage reduction of a prior pump output flow rate.

4. The method as claimed in claim 1, wherein the pump operating condition is that the pumps have been activated for a period more than a predetermined time threshold.

5. The method as claimed in claim 4, wherein the predetermined time threshold is calculated as a percentage increase of a prior duration that the pumps were activated.

6. The method as claimed in claim 1 which, prior to the step of temporarily deactivating the pumps, further includes the step of determining that the well level does not exceed a predetermined well level threshold.

7. The method as claimed in claim 1, wherein the step of determining the flow rate involves using a determined well volume rate.

8. The method as claimed in claim 7, further including the step of displaying any one or more of the determined: inflow rate, pump output flow rate and well volume rate.

* * * * *